US011134610B2

(12) United States Patent
Peng et al.

(10) Patent No.: US 11,134,610 B2
(45) Date of Patent: Oct. 5, 2021

(54) GRASS CUTTING HEAD AND GRASS TRIMMER USING THE SAME

(71) Applicant: Nanjing Chervon Industry Co., Ltd., Nanjing (CN)

(72) Inventors: Ming Peng, Nanjing (CN); Jianpeng Guo, Nanjing (CN); Dehong Ren, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/159,905

(22) Filed: Jan. 27, 2021

(65) Prior Publication Data

US 2021/0144914 A1    May 20, 2021

Related U.S. Application Data

(63) Continuation of application No. PCT/CN2019/099662, filed on Aug. 7, 2019.

(30) Foreign Application Priority Data

Aug. 7, 2018 (CN) .......................... 201810892146.X

(51) Int. Cl.
*A01D 34/416* (2006.01)
*A01D 34/90* (2006.01)
(52) U.S. Cl.
CPC ......... *A01D 34/4166* (2013.01); *A01D 34/90* (2013.01)
(58) Field of Classification Search
None
See application file for complete search history.

(56) References Cited

U.S. PATENT DOCUMENTS 8,025,249 B2 * 9/2011 Alliss ................. A01D 34/4165
242/388.1
9,918,428 B2 * 3/2018 Yamaoka ........... A01D 34/4165
(Continued)

FOREIGN PATENT DOCUMENTS

CN    104221578 A    12/2014
CN    205124344 U    4/2016
(Continued)

OTHER PUBLICATIONS

ISA/CN, Int. Search Report issued on PCT application No. PCT/CN2019/099662, dated Oct. 22, 2019, 2 pages.

*Primary Examiner* — Hwei-Siu C Payer
(74) *Attorney, Agent, or Firm* — Greenberg Traurig, LLP

(57) ABSTRACT

A grass cutting head includes a spool for winding a grass cutting line, a head housing for accommodating the spool, a first guiding structure disposed at least partially in the head housing, and a second guiding structure formed on the spool. The first guiding structure guides the grass cutting line through the head housing when threading the grass cutting line. The second guiding structure guides the grass cutting line to move and be wound around the spool by relative motion created between the spool and the head housing. The head housing includes a first housing and a second housing. The first guiding structure is disposed at least partially in the first housing. The spool is disposed between the first housing and the second housing. The first housing or the second housing is provided with an outer threading hole for allowing the grass cutting line to pass in or out.

20 Claims, 16 Drawing Sheets

(56) References Cited

U.S. PATENT DOCUMENTS

| | | | |
|---|---|---|---|
| 2018/0020615 A1* | 1/2018 | Alliss | A01D 34/4163 30/276 |
| 2020/0170182 A1* | 6/2020 | Guo | A01D 34/4166 |
| 2020/0236848 A1* | 7/2020 | Guo | A01D 34/90 |
| 2021/0144914 A1* | 5/2021 | Peng | A01D 34/416 |

FOREIGN PATENT DOCUMENTS

| | | |
|---|---|---|
| CN | 105746072 A | 7/2016 |
| JP | 2016059310 A | 4/2016 |

\* cited by examiner

GRASS CUTTING HEAD AND GRASS TRIMMER USING THE SAME

RELATED APPLICATION INFORMATION

The present application is a continuation of International Application Number PCT/CN2019/099662, filed on Aug. 7, 2019, through which this application also claims the benefit of Chinese Patent Application No. 201810892146.X filed on Aug. 7, 2018, which applications are incorporated herein by reference in their entirety.

BACKGROUND

As a lawn trimming tool among garden tools, grass trimmers have received widespread attention. Typically, the grass trimmer includes a grass cutting head, which is provided therein with a spool around which a grass cutting line is wound. In the related art, to wind the grass cutting line around the spool, the user usually needs to remove the spool to manually wind the grass cutting line, which is time-consuming and laborious, reducing the work efficiency. Accordingly, a grass cutting head is also available on the market that can wind the grass cutting line around the spool without the need to remove the spool. However, the user still needs to manually align the outer threading hole of the grass cutting head with the inner threading hole of the spool in order to achieve winding. Due to factors such as professionalism and operation environment, the user needs to spend a lot of effort to align the inner threading hole of the spool with the outer threading hole of the grass cutting head during threading. Furthermore, because the grass cutting line is relatively soft, it is impossible to quickly pass the grass cutting line through one outer threading hole and out of another outer threading hole during threading, thus making it time-consuming and laborious and reducing the user experience. As a result, the user still needs to remove the spool regularly to achieve the winding purpose, which reduces the work efficiency.

SUMMARY

In one example of the disclosure, a grass cutting head includes a spool, a head housing, a first guiding structure, and a second guiding structure. A grass cutting line is wound around the spool. The head housing is configured to accommodate at least part of the spool. The first guiding structure is disposed at least partially in the head housing or connected to the head housing. The first guiding structure is configured to guide the grass cutting line through the head housing when threading the grass cutting line. The second guiding structure is formed on the spool or connected to the spool. The second guiding structure is configured to guide the grass cutting line to move and be wound around the spool through the relative rotation between the spool and the head housing when winding the grass cutting line. The head housing includes a first housing and a second housing. The first guiding structure is disposed at least partially in or connected to the first housing. The spool is disposed between the first housing and the second housing. The first housing or the second housing is provided with an outer threading hole configured for allowing the grass cutting line to pass in or out.

In one example of the disclosure, a grass cutting head includes a spool, a head housing, a first guiding structure, and a second guiding structure. The spool is provided with a winding groove around which a grass cutting line is wound. The head housing is configured to accommodate at least part of the spool. The first guiding structure is disposed at least partially in the head housing or connected to the head housing. The first guiding structure is configured to guide the grass cutting line through the head housing without entering the spool when threading the grass cutting line. The second guiding structure is formed on the spool or connected to the spool. The second guiding structure is configured to guide the grass cutting line to leave the first guiding structure and be wound around the winding groove of the spool through the relative rotation between the spool and the head housing when winding the grass cutting line.

In one example of the disclosure, a grass trimmer includes a grass cutting head, a motor, a spool, a head housing, a first guiding structure, and a second guiding structure. The motor is configured to drive the grass cutting head to rotate around a first axis. A grass cutting line is wound around the spool. The head housing is configured to accommodate at least part of the spool. The first guiding structure is disposed at least partially in the head housing or connected to the head housing. The first guiding structure is configured to guide the grass cutting line through the head housing when threading the grass cutting line. The second guiding structure is formed on the spool or connected to the spool. The grass trimmer further has a winding mode. The second guiding structure is configured to guide the grass cutting line to move and to be wound around the spool through the relative rotation between the spool and the head housing when winding the grass cutting line.

DETAILED DESCRIPTION

Figure 1:
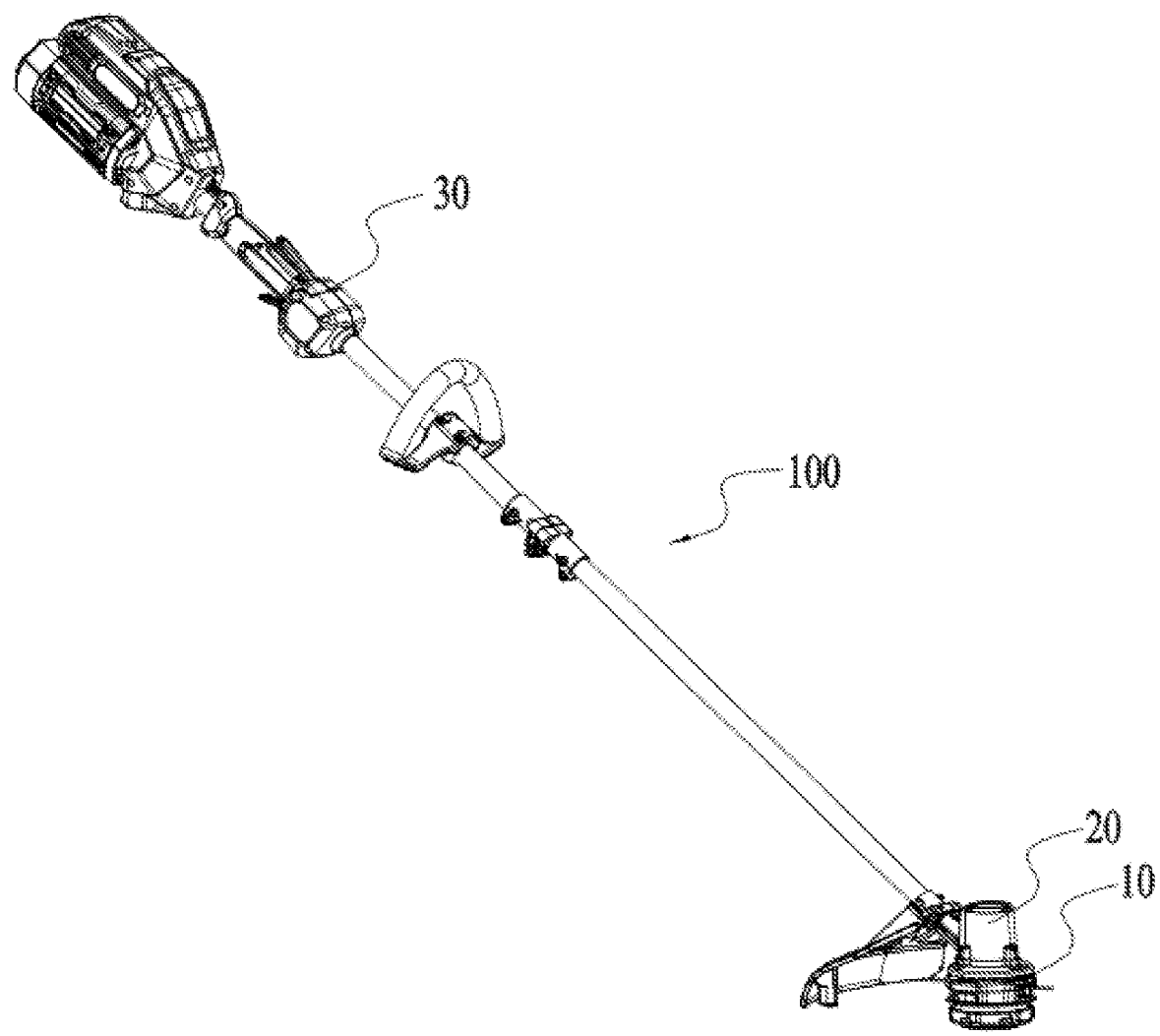
FIG. 1 is a perspective view of a grass trimmer according to a first example of the present disclosure.

FIG. 1 is a schematic view of a grass trimmer 100 according to an example. In this example, the grass trimmer 100 includes a grass cutting head 10, a driving apparatus 20, and an operating apparatus 30.

Figure 2:
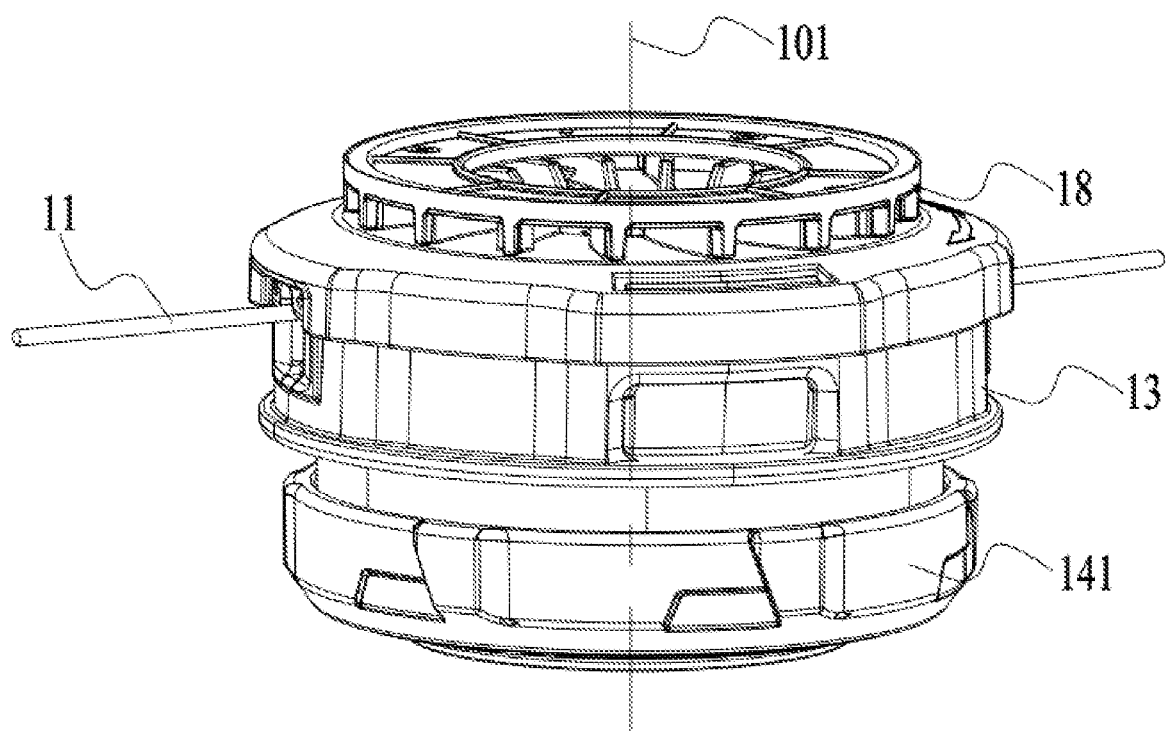
FIG. 2 is a perspective view of the grass cutting head of the grass trimmer of FIG. 1.

As illustrated in FIG. 1 and FIG. 2, the driving apparatus 20 drives the grass cutting head 10 to rotate around a first axis 101 and then drives a grass cutting line 11 to rotate and cut vegetation. The user operates the operating apparatus 30 to control the grass trimmer 100.

The driving apparatus 20 includes a motor and a driving shaft. The driving shaft is connected to the grass cutting head 10 to drive the grass cutting head 10 to rotate around the first axis 101.

Figure 3:
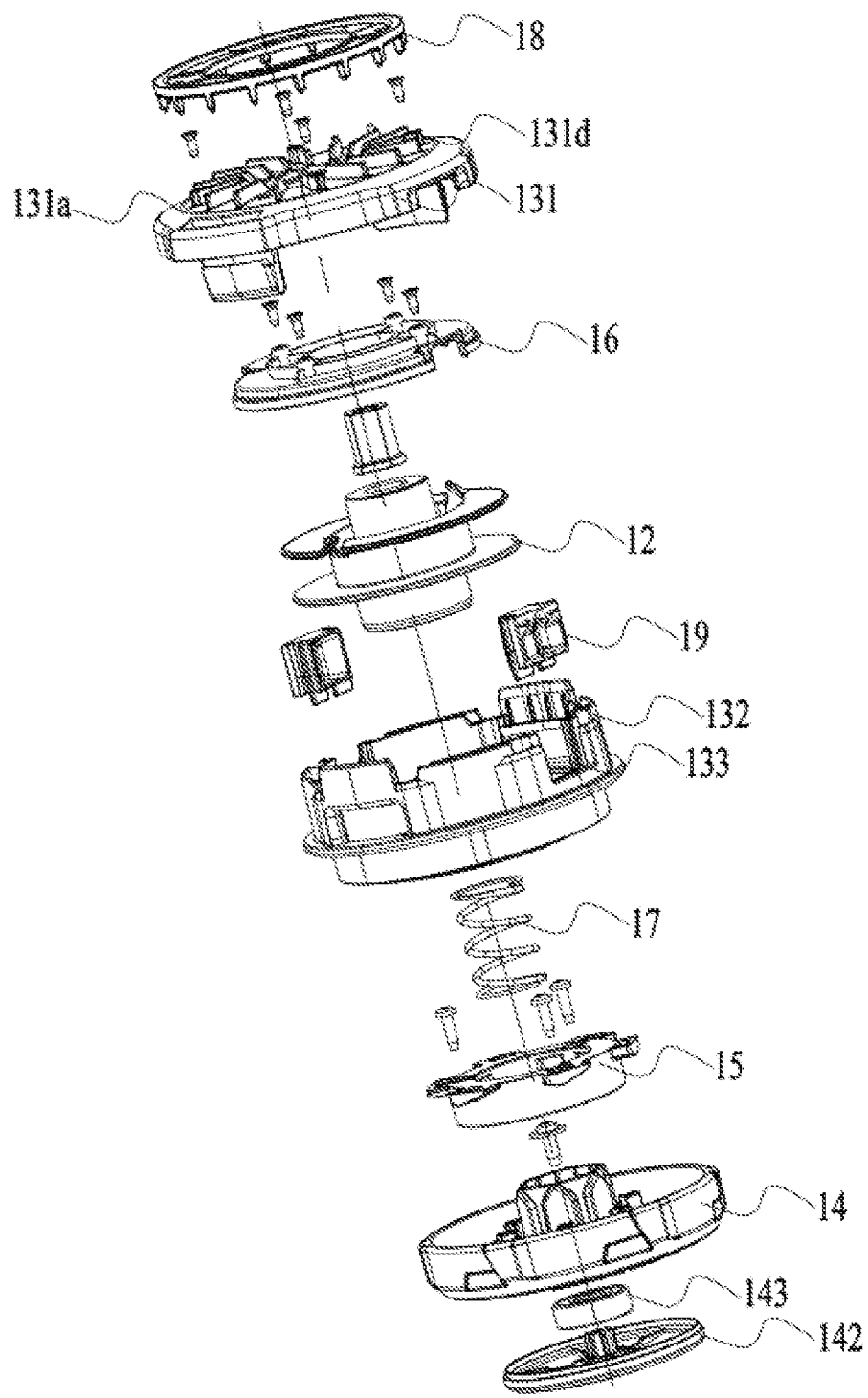
FIG. 3 is an exploded view of the grass cutting head of FIG. 2.
Figure 4:
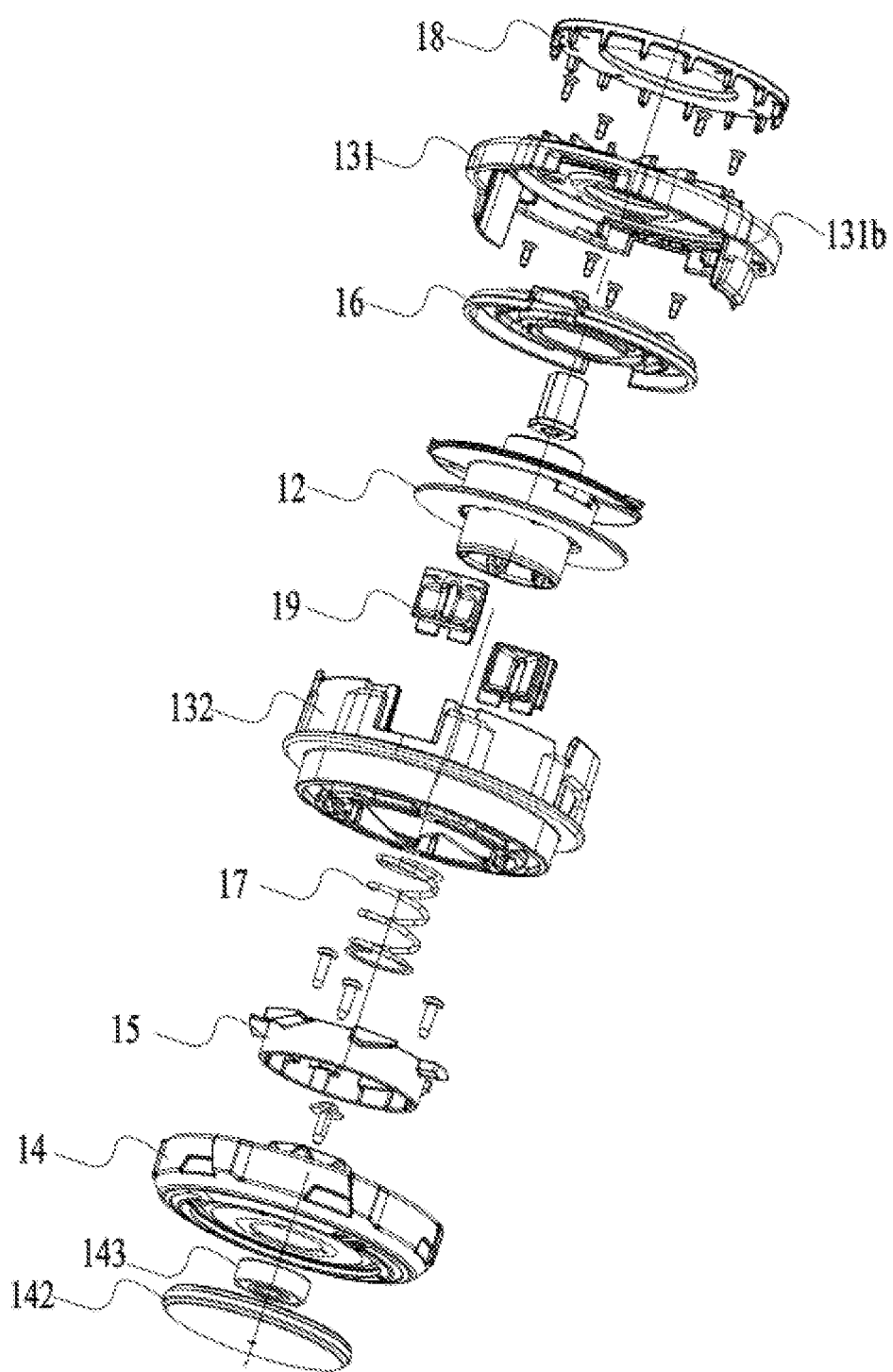
FIG. 4 is an exploded view of the grass cutting head of FIG. 3 taken from another perspective.

As illustrated in FIG. 2 and FIG. 3, the grass cutting head 10 includes a spool 12 and a head housing 13. The grass cutting line 11 is wound around the spool 12. The spool 12 is accommodated in the head housing 13. The spool 12 is provided with a winding groove 127 (see FIG. 7). As illustrated in FIG. 3 and FIG. 4, the head housing 13 is provided with an outer threading hole 133 through which the grass cutting line 11 passes. The outer threading hole 133 is further provided with an eyelet member 19. In an example, the head housing 13 includes a first housing 131 and a second housing 132, which facilitates assembly of the head housing 13 with the spool 12 and also facilitates the user to open the head housing 13 to detect a condition inside the head housing 13.

As illustrated in FIGS. 2 to 4, from top to bottom in the direction of the first axis 101, the grass cutting head 10 includes the head housing 13, the spool 12, and an operating member 14. The head housing 13 is provided with one accommodation space. The spool 12 is installed in this accommodation space. The operating member 14 is connected to the head housing 13 through an intermediate member 15. The driving shaft connected to the spool 12 to drive the spool 12 to rotate is disposed on the motor, and the driving shaft drives the grass cutting head 10 to rotate with the first axis 101 as an axis. That is, the spool 12 is connected to the driving apparatus 20 to introduce the power output by the driving apparatus 20 into the grass cutting head 10. The operating member 14 is connected to the spool 12 and at least part of the operating member 14 protrudes to the outside of the head housing 13 for the user to operate. The grass cutting head 10 has a winding mode and a cutting mode. This winding mode is a manual winding mode. In the case where the grass cutting head 10 is in the manual winding mode, the user can rotate the operating member 14 so that the spool 12 rotates in a first rotation direction relative to the head housing 13 with the first axis 101 as the axis. In this case, the grass cutting line 11 can be wound to the spool 12. In the case where the user activates the motor by operating the main switch, the motor drives the spool 12 to rotate in a second rotation direction with the first axis 101 as the axis so that the grass trimmer 100 is in the trimmer mode. In this example, when viewed from the motor to the grass cutting head 10, the first rotation direction may be regarded as a counterclockwise direction, and correspondingly, the second rotation direction may be regarded as a clockwise direction, but of course, it is not limited thereto. In other examples, the driving shaft on the motor may also be connected to the head housing 13, and the operating member 14 may also rotate together with the head housing 13. In this manner, the user rotates the operating member 14 to drive the head housing 13 to rotate so that there is a relative rotation between the spool 12 and the head housing 13, and thus the grass cutting line 11 is wound around the spool 12.

As illustrated in FIGS. 5 to 9, to facilitate the user to quickly insert the grass cutting line 11 into the grass cutting head 10 and be wound around the spool 12 without removing the grass cutting head 10, this application provides a guiding component to guide the grass cutting line 11 to be wound around the spool 12. The guiding component includes a first guiding structure 16 and a second guiding structure 125. The first guiding structure 16 facilitates the user to quickly pass the grass cutting line 11 through the inside of the grass cutting head 10, and guide the grass cutting line 11 to be wound around the spool 12 through the second guiding structure 125.

In an example, the first guiding structure 16 is a threading channel disposed at least partially in the head housing 13, the second guiding structure 125 is disposed on the spool 12, and the threading channel is located outside the spool 12. In this manner, in the case where the spool 12 is installed inside grass cutting head 10, the user may directly pass the grass cutting line 11 in the threading channel on the head housing 13 through one outer threading hole 133 on the head housing 13, and pass it out of another outer threading hole 133. In this case, guided by the threading channel, the grass cutting line 11 passes through the grass cutting head 10, and then the spool 12 is rotated, the grass cutting line 11 is guided into the winding groove 127 of the spool 12 through the second guiding structure 125 on the spool 12, and then the spool 12 is rotated until the entire grass cutting line 11 is wound around the spool 12 so that the storage of the grass cutting line 11 can be achieved.

Figure 5:
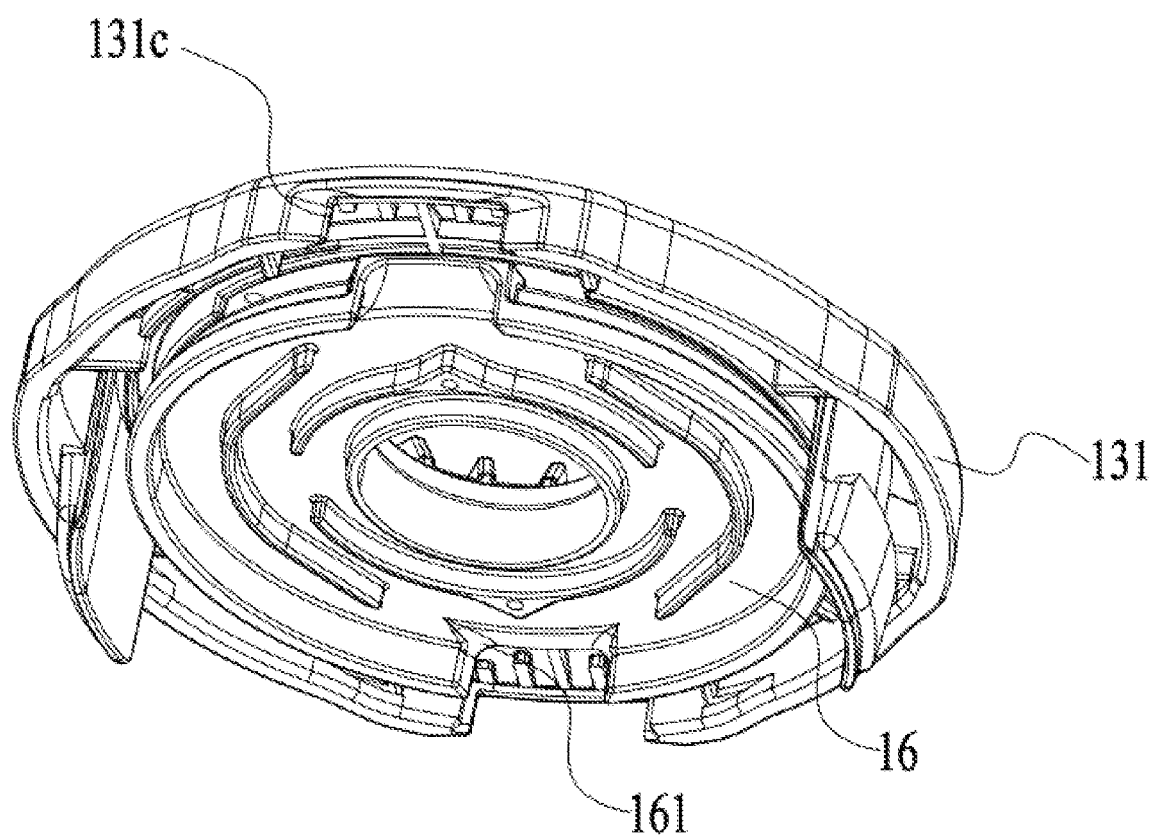
FIG. 5 is a combined perspective view of the first housing and the first guiding structure of the grass cutting head of FIG. 4.

As illustrated in FIG. 5, the first housing 131 is provided with an opening 131c for threading, the second housing 132 is connected to the first housing 131, and the second housing 132 rotates synchronously with the first housing 131. After the first housing 131 and the second housing 132 are connected, the first housing 131 and the second housing 132 jointly form the preceding accommodation space around the first axis 101. In this example, the first housing 131 and the second housing 132 are connected by a snap so that a detachable connection is formed between the first housing 131 and the second housing 132. As shown in FIG. 3 and FIG. 4, the first housing 131 includes a first surface 131a and a second surface 131b. The first surface 131a is provided with or connected to a first airflow member 131d. The first airflow member 131d generates an airflow away from the grass cutting head 10 in the case where the first airflow member 131d rotates with the grass cutting head 10. The first airflow member 131d is a fan blade formed on the first surface 131a of the first housing 131. In the case where the fan blade rotates at a high speed, on the one hand, the fan blade can prevent grass clippings from being wound on the driving shaft of the motor, and on the other hand, the fan blade can perform heat dissipation. In an example, the fan blade is also fixedly connected to or integrally formed with an anti-wrapping cover 18. The anti-wrapping cover 18 can prevent grass clippings from entering the grass cutting head 10 and prevent the grass cutting head 10 from failing.

Figure 6:
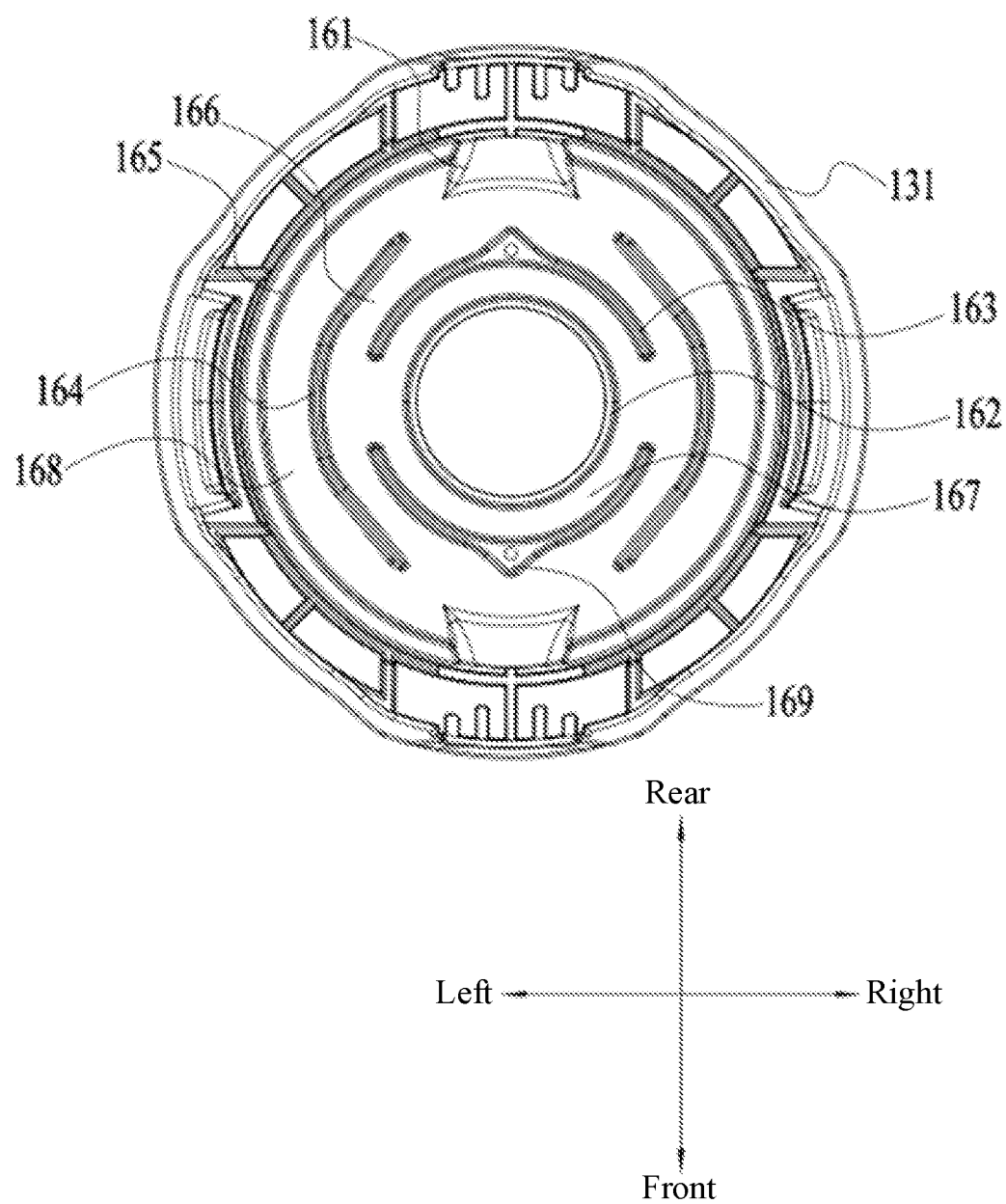
FIG. 6 is a combined plan view of the first housing and the first guiding structure of the grass cutting head of FIG. 5.

As illustrated in FIGS. 4 to 6, the second surface 131b of the first housing 131 is provided with or connected to the first guiding structure 16. In this example, the first guiding structure 16 and the first housing 131 are formed separately and fixedly connected by screws. In other examples, the connection manner of the first guiding structure 16 and the first housing 131 is not limited to the preceding connection manners, and other fixed connection or detachable connection manners such as snap connection or bonding may be used as long as the first guiding structure 16 is connected to the first housing 131 without relative displacement. Alternatively, the first guiding structure 16 and the first housing 131 are integrally formed. In this example, the front side, the rear side, the left side, and the right side are defined in FIG. 6. As shown in FIG. 6, in the case where the first guiding structure 16 and the first housing 131 are fixedly connected to form an entirety, a channel through which the grass cutting line 11 passes is formed in the front-and-rear direction. In the left-and-right direction, the first housing 131 is provided with a connecting portion configured to be connected to the second housing 132. The first guiding structure 16 is provided with a notch 161. The first housing 131 is provided with the opening 131c (refer to FIG. 5). The notch 161 and the opening 131c correspond to each other and communicate with the outer threading hole 133 configured for allowing the grass cutting line 11 to pass in or out. The integral structure formed by the first housing 131 and the first guiding structure 16 forms a first through hole around the first axis 101. The driving shaft is capable of passing through the first through hole. The first guiding structure 16 forms a threading channel around the first through hole.

In an example, the plane where the threading channel is located is defined as a first plane, and the first plane is basically coplanar with the second surface 131b of the first housing 131. As illustrated in FIG. 6, on the first plane, the first guiding structure 16 is provided with multiple protrusions distributed around the first through hole. The multiple protrusions divide the first plane into three areas, which are a threading guiding area 166 through which the grass cutting line 11 passes, a temporary storage area 167 for the grass cutting line 11, and a rotation area 168 in which the second guiding structure 125 rotates, respectively. The multiple protrusions include a first protrusion 162, a second protrusion 163, a third protrusion 164, and a fourth protrusion 165. The circumferential radius from the position of the first protrusion 162 to the position of the fourth protrusion 165 gradually increases, and the first protrusion 162, the second protrusion 163, the third protrusion 164, and the fourth protrusion 165 are all ridges protruding from the first plane. The first protrusion 162 and the second protrusion 163 form the temporary storage area 167 for the grass cutting line 11. The second protrusion 163 and the third protrusion 164 form the threading guiding area 166. The third protrusion 164 and the fourth protrusion 165 form the rotation area 168.

The first protrusion 162 is a continuous and smooth circle formed around the first through hole. The second protrusion 163 is a continuous and irregular circular arc or line segment formed around the first through hole. The second protrusion 163 includes one or more circular arcs or line segments, and a guiding portion 169 that guides the insertion of the grass cutting line 11 is formed at the notch 161. The projection of the guiding portion 169 on the first plane is basically triangular. The guiding portion 169 protrudes from the circumference where the second protrusion 163 is located and is symmetrical with respect to the front-and-rear direction as shown in the figure. The guiding portion 169 and the second protrusion 163 are integrally formed. The guiding portion 169 is continuous and smooth, which facilitates the insertion of the grass cutting line 11. In this example, two guiding portions 169 are disposed symmetrically with respect to the left-and-right direction. Two guiding portions 169 divide the threading guiding area 166 into two sections, and the grass cutting line 11 is capable of passing through both sections. Alternatively, in other examples, one of the guiding sections may be closed and only one guiding section is opened for the grass cutting line 11 to pass through. The third protrusion 164 is a continuous but irregular circular arc formed around the first through hole and is broken at the notch 161 so that two arc segments symmetrical with respect to the front-and-rear direction are formed. The fourth protrusion 165 is a continuous circular arc formed around the first through hole and is broken at the notch 161 so that an opening for the grass cutting line 11 to pass out of or in is formed.

Figure 7:
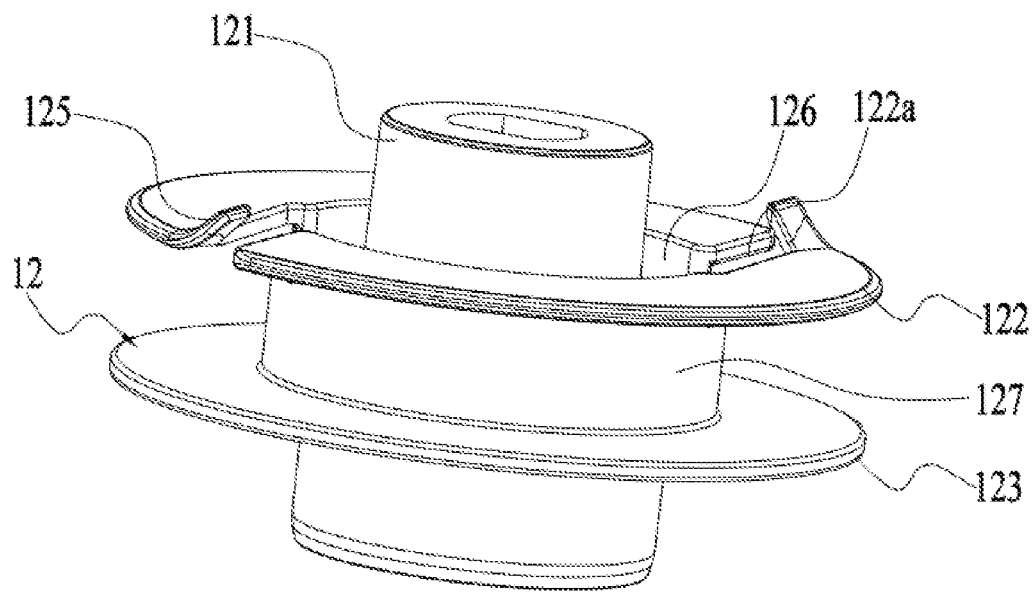
FIG. 7 is a perspective view of the spool of the grass cutting head of FIG. 3.
Figure 8:
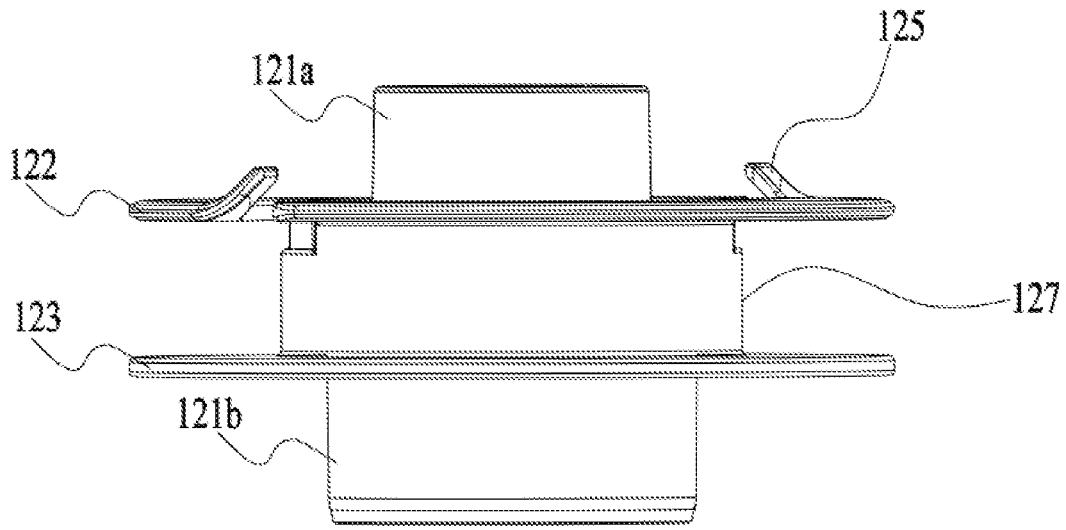
FIG. 8 is a plan view of the spool of the grass cutting head of FIG. 7.
Figure 9:
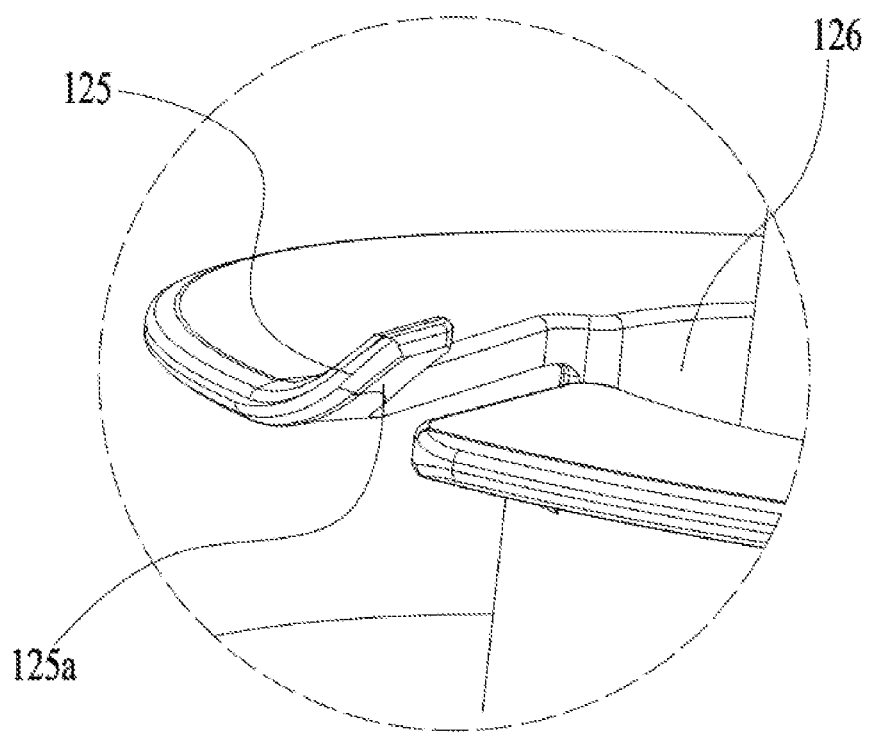
FIG. 9 is a partial enlarged view of the spool of the grass cutting head of FIG. 3.

As illustrated in FIG. 7 to FIG. 8, the spool 12 includes a main body 121 and a stopper formed around the main body 121. The stopper includes a first stopping portion 122 and a second stopping portion 123. The winding groove 127 is formed between the first stopping portion 122 and the second stopping portion 123. The stopper is configured to prevent the grass cutting line 11 from detaching from the winding groove 127 in the direction of the first axis 101. In a plane perpendicular to the direction of the first axis 101, the projections of the first stopping portion 122 and the second stopping portion 123 basically overlap and form a ring around the main body 121. The main body 121 includes a first section 121a and a second section 121b. The first section 121a is a hollow cylinder formed around the first axis 101. The second section 121b is also a hollow cylinder formed around the first axis 101. The outer diameter of the cylinder of the first section 121a is less than the outer diameter of the cylinder of the second section 121b. The first section 121a and the second section 121b are connected at a position close to the first stopping portion 122 and deviate from the position of the first stopping portion 122. In an example, the first stopping portion 122 is further provided with an accommodation groove 126 around the first section 121a of the main body 121. The accommodation groove 126 is configured to accommodate the grass cutting line 11. This accommodation groove 126 is a circular notch formed by the first section 121a of the main body 121 and the first stopping portion 122. The projections of this accommodation groove 126 and the temporary storage area 167 in the direction perpendicular to the first axis 101 at least partially overlap. In this example, the accommodation groove 126 and the temporary storage area 167 basically overlap, and the accommodation groove 126 and the temporary storage area 167 form an accommodation portion that accommodates at least part of the grass cutting line 11. The first stopping portion 122 is further provided with the second guiding structure 125 that guides the grass cutting line 11 to be wound around the winding groove 127. In an example, the first stopping portion 122 is provided with two openings 122a symmetrical with respect to the first axis 101. These openings 122a are basically polygonal and communicate with the accommodation groove 126. A fulcrum portion that guides the grass cutting line 11 to be wound around the winding groove 127 is formed at the junction of the accommodation groove 126 and the openings 122a. The fulcrum portion is configured to apply a reverse force to the grass cutting line 11 to prevent the following situation: in the case where the user performs winding, the direction of the force is basically the same as the direction of the grass cutting line 11 so that winding fails. The second guiding structure 12 is disposed on the first stopping portion 122 and located at the openings 122a. The structure that is formed at the openings 122a, protrudes from the plane of the first stopping portion 122 and is farther from the first stopping portion 122 is the second guiding structure 125. As shown in FIG. 9, the second guiding structure 125 is a protrusion upward tilted from the stopper and is provided with a guiding surface 125a. This guiding surface 125a is smooth and continuous and integrally formed with the first stopping portion 122. Alternatively, in the case where the strength of the spool 12 is insufficient, the second guiding structure 125 may also be an independent element that satisfies the strength requirement and is fixedly connected to the first stopping portion 122. Moreover, to prevent the grass cutting line 11 from slipping out from the upper end of the second guiding structure 125, the notch between the second guiding structure 125 and the head housing 13 is configured to be less than the diameter of the grass cutting line 11. In this manner, the grass cutting line 11 may only slide into the accommodation groove 126 from the openings 122a. In an example, two second guiding structures 125 are disposed, and the two second guiding structures 125 are respectively located at the two openings 122a of the first stopping portion 122.

Figure 10:
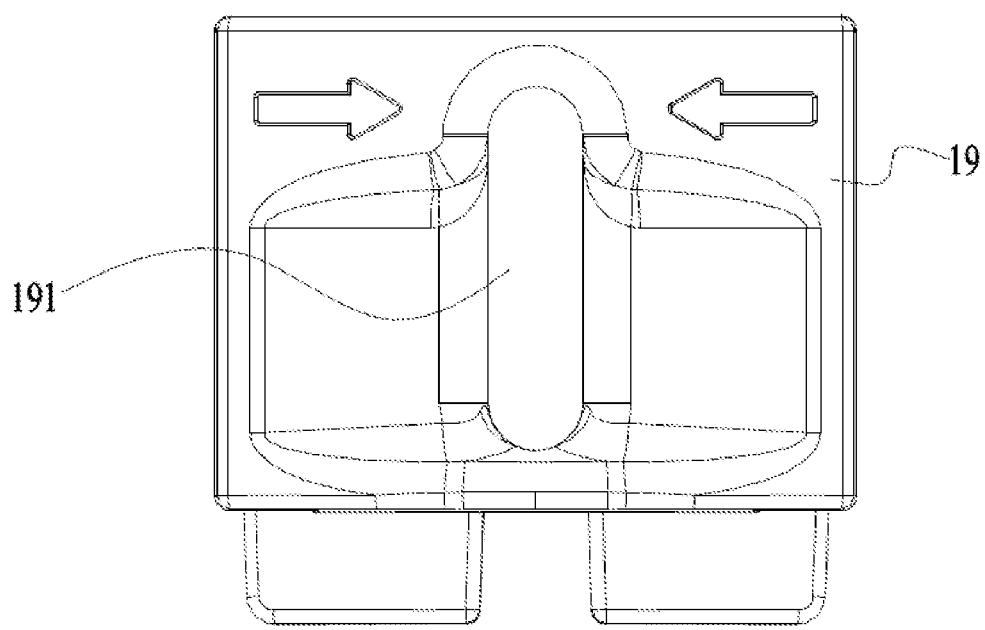
FIG. 10 is a plan view of the eyelet member of the grass cutting head of FIG. 3.
Figure 11:
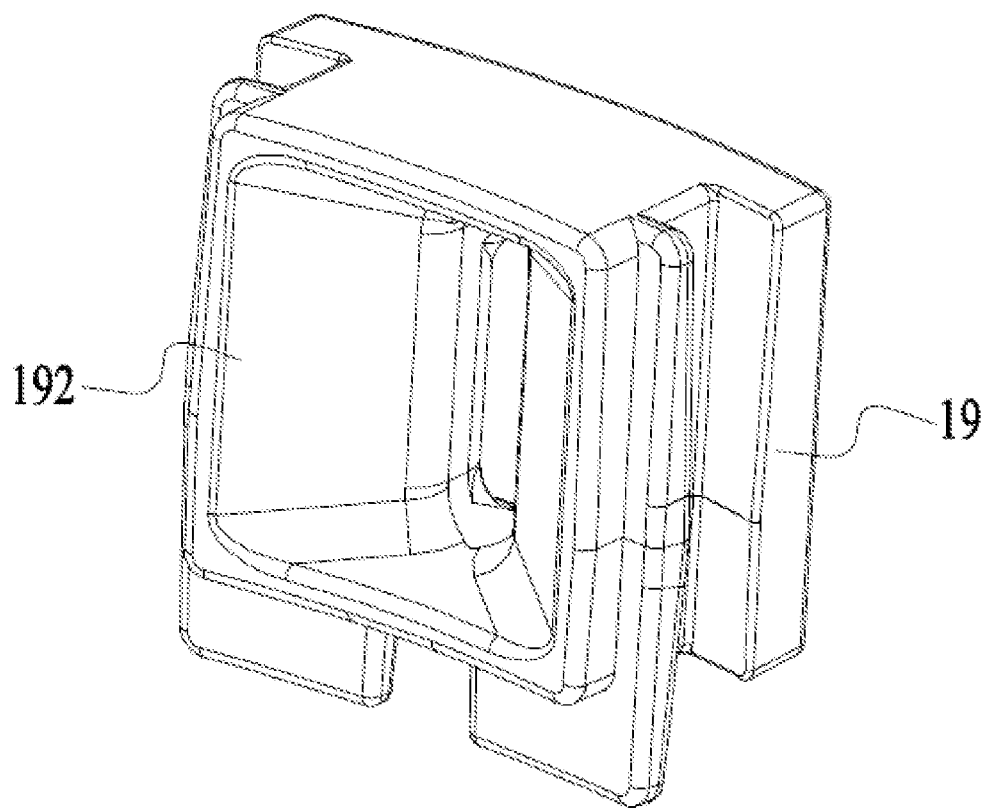
FIG. 11 is a perspective view of the eyelet member of the grass cutting head of FIG. 10.

To match with the grass cutting line 11 to be smoothly inserted into the threading channel of the first guiding structure 16, the eyelet member 19 as shown in FIG. 10 to FIG. 11 is further provided. This eyelet member 19 includes a third surface and a fourth surface. The third surface of the eyelet member 19 includes a threading hole 191. The threading hole 191 is specifically waist-shaped and extends in a straight line parallel to the first axis 101. As shown in FIG. 11, the fourth surface of the eyelet member 19 is provided with a guiding surface 192. The opening of the guiding surface 192 gradually expands and the sidewall of the guiding surface 192 is continuous and smooth. The third surface is communicated with the fourth surface through the threading hole 191. Two eyelet members 19 are provided. The two eyelet members 19 are respectively installed on the outer threading hole 133 of the head housing 13. The grass cutting line 11 is inserted into one of the eyelet members 19 and out of the other one of the eyelet members 19. The guiding surface 192 on the threading hole 191 of the eyelet members 19 can facilitate the passing-out of the grass cutting line 11. In an example, in the threading mode, the threading hole 191 of these eyelet members 19 can achieve the passing-in of the grass cutting line 11 and the passing-out of the grass cutting line 11.

As illustrated in FIG. 3 and FIG. 4, the operating member 14 rotates synchronously with the spool 12. The spool 12 is fixed in a position in the direction of the first axis 101 relative to the first housing 131. The operating member 14 is slidably connected to the spool 12 in the direction of the first axis 101 or a direction parallel to the first axis 101. The operating member 14 is at least partially located outside of the head housing 13. The head housing 13 is further provided with a second through hole that allows the operating member 14 to partially extend into the accommodation space in the direction of the first axis 101 from the outside of the accommodation space. The second through hole may be formed by the second housing 132. The operating member 14 may also close at least part of the second through hole. As shown in FIG. 2, the portion of the operating member 14 located outside of the head housing 13 is provided with an operating portion 141 for the user to operate. In the case where the user rotates the operating portion 141, the operating member 14 drives the spool 12 to rotate together with the operating member 14. The operating portion 141 rotates around the second housing 132 with the first axis 101 as the axis. A notch is further formed between the operating portion 141 and the second housing 132 to communicate the interior and exterior of the accommodation space. In this manner, abrasion between the operating portion 141 and the second housing 132 can be avoided, and a movement stroke of the operating portion 141 sliding in the direction of the first axis 101 can be provided. In an example, to prevent dust from entering the notch, a dust-proof structure may also be disposed at this notch.

In this example, the operating portion 141 surrounds at least part of the head housing 13 in the circumference around the first axis 101 so that the head housing 13 is at least partially located in the space surrounded by the operating portion 141. In this manner, the diameter of the operating portion 141 is relatively large, and thus the user can rotate the operating member 14 more comfortably. To enable the motor to drive the grass cutting head 10 to rotate in the second rotation direction with the first axis 101 as the axis to achieve the trimming function, as shown in FIG. 3 and FIG. 4, the grass cutting head 10 further includes an intermediate member 15 for achieving dynamic torque transmission between the spool 12 and the head housing 13. The intermediate member 15 rotates synchronously with the spool 12, and the intermediate member 15 is slidably connected to the spool 12 in the direction of the first axis 101. In this example, the intermediate member 15 is fixedly connected to the operating member 14 by screws. The entirety formed by the intermediate member 15 and the operating member 14 rotates synchronously with the spool 12, and this entirety slides relative to the spool 12 in the direction of the first axis 101. In other examples, the intermediate member 15 may also be integrally formed with the operating member 14. In an example, the number of parts for achieving torque transmission between the spool 12 and the head housing 13 is not limited to one, but may be more than one. In this case, the intermediate member 15 may be understood as one of the parts.

Figure 12:
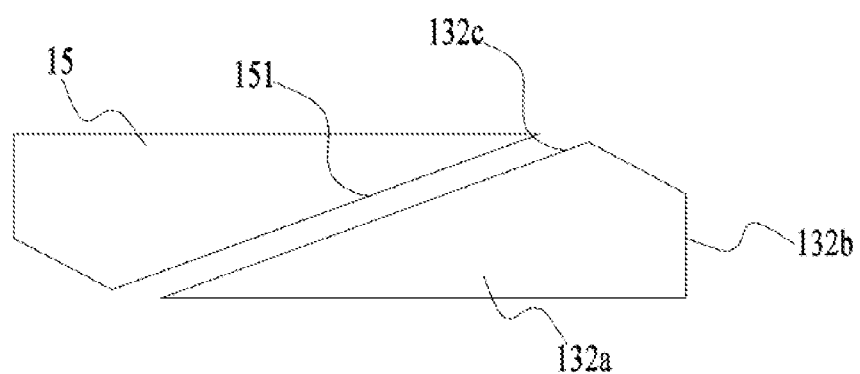
FIG. 12 is a plan view illustrating that the driving portion and the matching portion of the grass cutting head of FIG. 3 match each other.

As illustrated in FIG. 12, the intermediate member 15 is provided with a driving portion 151, and the head housing 13 is provided with a matching portion 132a that matches with the driving portion 151. In an example, the matching portion 132a is provided with a driving surface 132b and a spanning surface 132c. In the case where the driving portion 151 is located in a position in contact with the driving surface 132b of the matching portion 132a, the driving surface 132b prevents the spool 12 from rotating in the second rotation direction relative to the head housing 13 to receive the driving force of the driving portion 151. In this case, in the condition where the motor drives the spool 12 to rotate in the second rotation direction with the first axis 101 as the axis, the driving portion 151 matches with the driving surface 132b so that the head housing 13 rotates along with the spool 12 in the second rotation direction with the first axis 101 as the axis, and thus the trimming function can be achieved. In the case where the user rotates the operating member 14 in the first rotation direction with the first axis 101 as the axis, the spanning surface 132c of the matching portion 132a allows the driving portion 151 to slide along the spanning surface 132c. In this case, the entirety formed by the intermediate member 15, the operating member 14, and the spool 12 rotates in the first rotation direction relative to the head housing 13 with the first axis 101 as the axis so that the grass cutting line 11 is wound around the spool 12, and thus the winding function can be achieved. In this example, in the case where the winding is needed, the user needs to hold the head housing 13 with one hand and rotate the operating member 14 in the first rotation direction with the first axis 101 as the axis with the other hand. In this case, the spanning surface 132c allows the spool 12 to rotate relative to the head housing 13 with the first axis 101 as the axis. In other examples, the grass cutting head 10 may further be provided with a restricting apparatus that restricts the rotation of the head housing 13 so that the user does not need to hold the head housing 13 with one hand and rotate the operating member 14 with the other hand to perform the winding function. In this manner, as long as the user fixes the position of the grass trimmer 100 and rotates the operating member 14 with one hand, the grass cutting line 11 is wound around the spool 12. Therefore, the following problem can be avoided: the grass cutting line 11 is wound around the arm. In other examples, in the case where the head housing 13 is connected to the motor and the driving force output by the motor may be introduced into the grass cutting head 10, the operating member 14 and the intermediate member 15 may both rotate together with the head housing 13, and the intermediate member 15 is further slidably connected to the head housing 13. Through the power transmission performed by the intermediate member 15, the spool 12 rotates with the head housing 13 so that the trimming function can be achieved.

The operating member 14 may also slide to a first position and a second position when sliding in the direction of the first axis 101 relative to the spool 12. In the case where the operating member 14 slides to the first position, the intermediate member 15 also slides in the direction of the first axis 101 to a driving position along with the operating member 14. In this case, the driving portion 151 matches with the matching portion 132a. In this case, in the condition where the motor drives the spool 12 to rotate in the second rotation direction with the first axis 101 as the axis, and driven by the driving portion 151, the head housing 13 rotates with the spool 12 so that the grass cutting head 10 is in the cutting mode in this case. In the case where the grass trimmer 100 is in the process of trimming, in the condition where the user makes the grass cutting head 10 hit the ground in this case, the ground applies a reverse force to the operating member 14 so that the operating member 14 slides to the second position in the direction of the first axis 101, and the intermediate member 15 also slides along the first axis 101 to a non-driving position along with the operating member 14. In this case, the driving portion 151 is disengaged from the matching portion 132a so that the spool 12 rotates in the second rotation direction relative to the head housing 13, and thus the grass cutting head 10 is in a pay-off mode, and the length of the grass cutting line 11 extending from the head housing 13 increases.

As illustrated in FIG. 3 and FIG. 4, the grass cutting head 10 further includes a biasing element 17 that is arranged in a biased manner between the spool 12 and the operating member 14 to bias the operating member 14 to move toward the first position. The biasing element 17 may be a coil spring. The spanning surface 132c of the matching portion 132a slidably matches with the driving portion 151 so that the spanning surface 132c allows the entirety formed by the intermediate member 15 and the operating member 14 to slide along the spanning surface 132c relative to the matching portion 132a.

The operating element 14 is further connected to a contact 142, and the contact 142 is connected to the operating portion 141 of the operating element 14. The contact 142 is located outside of the accommodation space, and the contact 142 includes a contact surface in contact with the ground in the case where the grass cutting head 10 is trimming. The contact 142 is rotatably connected to the operating member 14 with the first axis 101 as the axis. In this manner, in the case where the grass cutting head 10 is trimming, the grass cutting head 10 rotates at a high speed with the first axis 101 as the axis. The grass cutting head 10 rotates at a relatively high speed. The contact 142 is in contact with the ground so that the abrasion of the grass cutting head 10 can be effectively prevented and the service life of the grass cutting head 10 can be improved. The contact 142 is rotatably connected to the operating member 14 through a connecting member. In this example, this connecting member is a one-way bearing 143. The one-way bearing 143 enables the contact 142 to rotate in the first rotation direction relative to the operating member 14 with the first axis 101 as the axis and prevents the contact 142 from rotating in the second rotation direction relative to the operating member 14 with the first axis 101 as the axis. The entirety formed by the operating member 14 and the contact 142 is capable of closing the second through hole formed by the second housing 132.

In the case where the user needs to perform the winding, the user passes the grass cutting line 11 in the upper side of the threading hole 191 of one eyelet member 19 and out of another eyelet member 19 guided by the first guiding structure 16 and places the grass cutting line 11 in the upper position of the threading hole 191. During this period, the spool 12 is at an arbitrary position relative to the head housing 13. The user does not need to perform any alignment operations between the head housing 12 and the spool 13, which greatly improves the operating convenience of the user. In this case, the user operates the operating portion 141 of the grass cutting head 10 to rotate in the first direction, the operating member 14 drives the spool 12 to rotate together with the operating member 14 in the direction of the first axis 101, and the second guiding structure 125 on the spool 12 is located in the rotation area 168 of the first guiding structure 16 in this case. In the case where the second guiding structure 125 rotates to the notch 161 of the first guiding structure 16, the grass cutting line 11 is pushed by the guiding surface 125a of the second guiding structure 125, enters the temporary storage area 167 from the guiding area 166 of the first guiding structure 16, at least partially slides along the guiding surface 125a of the second guiding structure 125 into the accommodation groove 126 of the spool 12, and enters the winding groove 127 at the same time. In this case, the part where the grass cutting line 11 passes through the threading hole 191 moves downward along the hole wall of the threading hole 191. In an example, the position of the grass cutting line 11 in the eyelet member 19 slides from the upper position of the threading hole 191 to the lower position of the threading hole 191. The grass cutting line 11 is at least partially restricted in the accommodation groove 126 of the spool 12. Moreover, under the action of the fulcrum portion, in the case where the spool 12 rotates in the first rotation direction, a force facing away from the first rotation direction is applied to the grass cutting line 11 so that the grass cutting line 11 is wound around the winding groove 127, and then the operating member 14 is rotated in the first rotation direction, thereby driving the spool 12 to continue winding until the winding is completed. During the winding process, due to fatigue or the operation, the user operates discontinuously when operating the operating member 14 to rotate. Since the driving portion 151 matches with the driving surface 132b, the spool 12 and the head housing 13 are prevented from rotating in the second rotation direction. Therefore, while the grass cutting line 11 has rigidity, the grass cutting line 11 does not automatically rotate and leave in the second rotation direction.

After completing the winding, the user may operate the operating apparatus 30 to control the grass trimmer 100 to start trimming. Moreover, in the case where the grass cutting line 11 is worn to a preset condition, the contact 142 is hit. In this case, the operating member 14 and the spool 12 may slide from the first position to the second position in the direction of the first axis 101. The spool 12 achieves the pay-off under the action of a centrifugal force. In the case where the grass cutting line 11 is released to a preset length, trimming may be continued.

The first guiding structure 16 is provided to guide the grass cutting line 11 through the head housing 13, and the second guiding structure 125 is provided to guide the grass cutting line 11 into the spool 12 to be wound. In this manner, the user does not need to align the relative positions of the spool 12 and the head housing 13 to perform the threading and winding, and thus the work efficiency and operating experience of the user can be improved.

Figure 13:
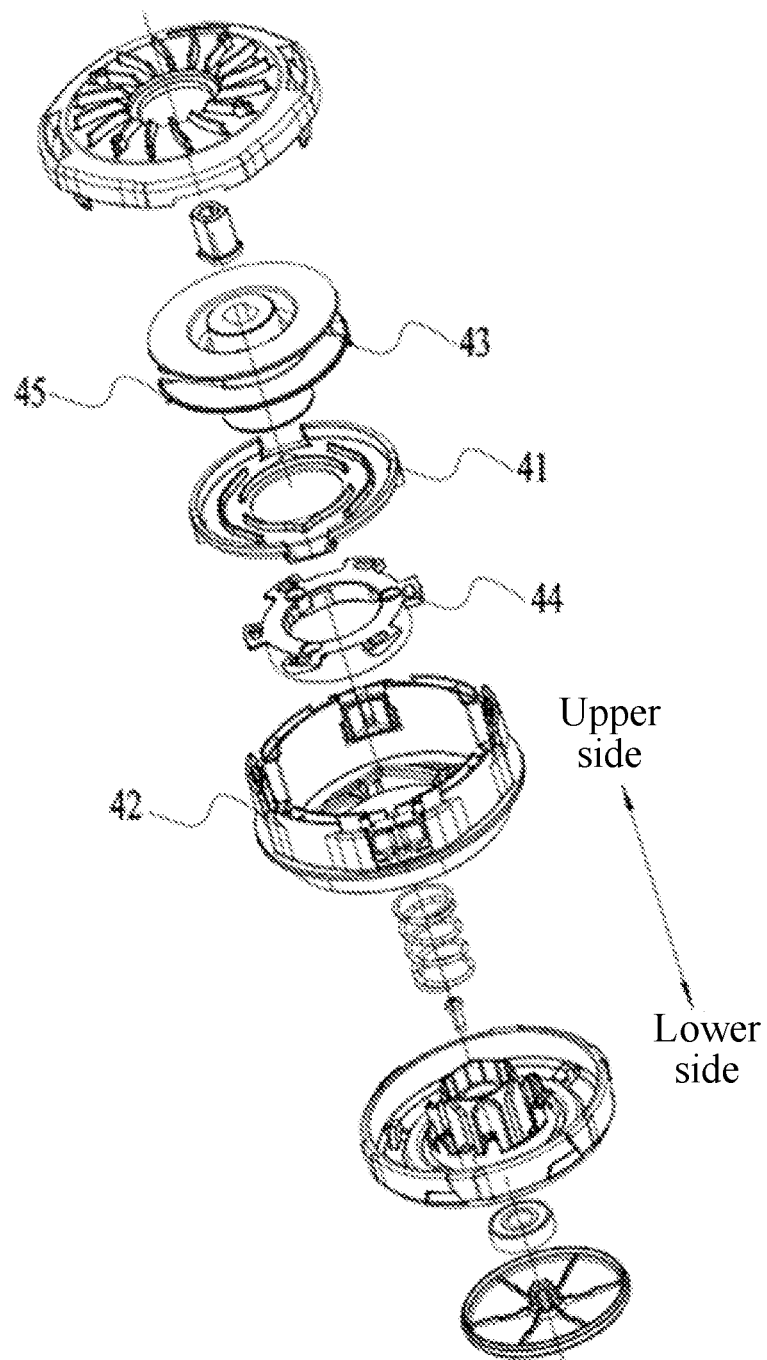
FIG. 13 is an exploded view of a grass cutting head according to second example.
Figure 14:
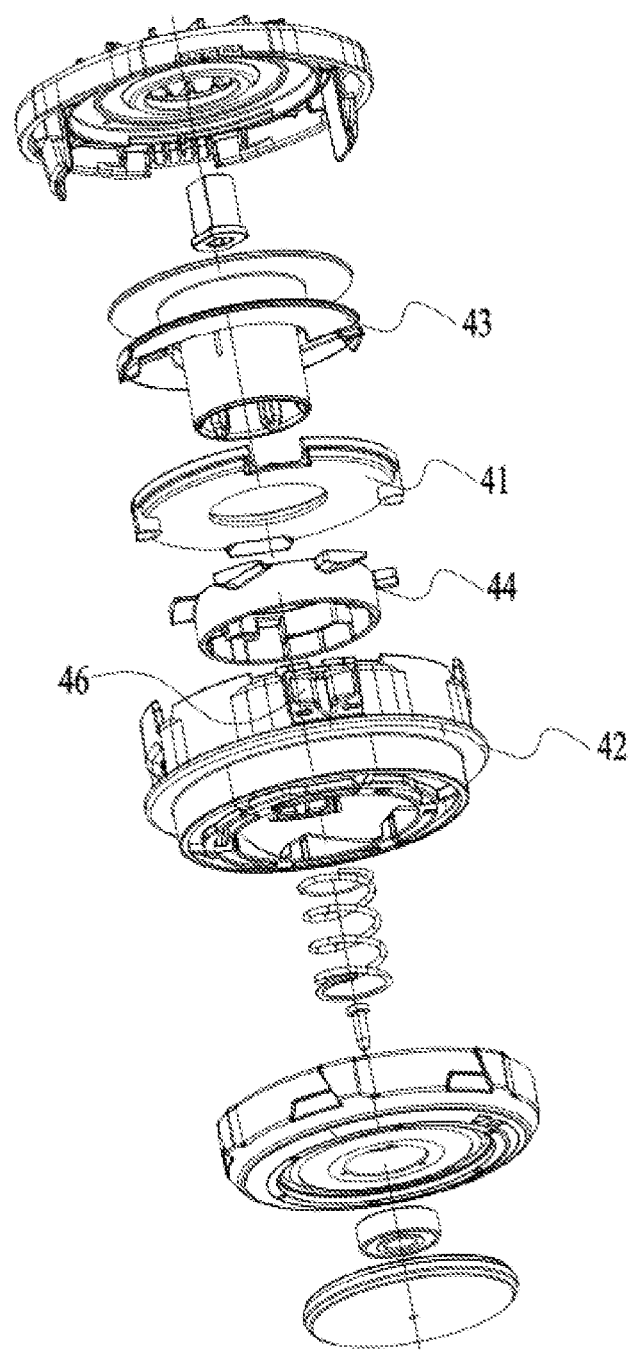
FIG. 14 is an exploded view of the grass cutting head of FIG. 13 taken from another perspective.

In an example, the first guiding structure may also be connected to other positions of the head housing. FIG. 13 and FIG. 14 show the structure of the grass cutting head in a second example. In this example, the grass cutting head has the same driving apparatus and operating apparatus as in the first example, and only the structures in this example different from first example will be described below.

The upper side and the lower side are defined in FIG. 13. In this example, the third guiding member 41 is connected to the second housing 42 by a fixing member and is located between the spool 43 and the intermediate member 44. The structure of the third guiding member 41 is the same as the structure of the first guiding structure 16 in first example, except that the positions and orientations are different. The fourth guiding member 45 is located on the second stopping portion of the spool 43. The structure of the fourth guiding member 45 is the same as the structure of the second guiding structure 125 in first example, except that the positions are different. To match with the passing-through of the grass cutting line, as shown in FIG. 14, the head housing is further provided with two head housing eyelet members 46. The head housing eyelet member 46 is provided with a first threading hole 191 and a second threading hole 191. The first threading hole 191 is located at the lower position of the head housing eyelet member 46 shown in the figure, and the second threading hole 191 is located at the upper position of the head housing eyelet member 46 shown in the figure. The grass cutting line passes in the threading channel of the third guiding member 41 from the first threading hole 191 on the lower side of the figure and out of the first threading hole 191 of another head housing eyelet member 46 so that the operating member rotates in the first rotation direction, the grass cutting line at least partially rotates into the accommodation groove 126 of the spool 43 under the action of the fourth guiding member 45, and then the operating member is rotated, thereby achieving the winding by the same principle as in first example until the winding is completed.

Figure 15:
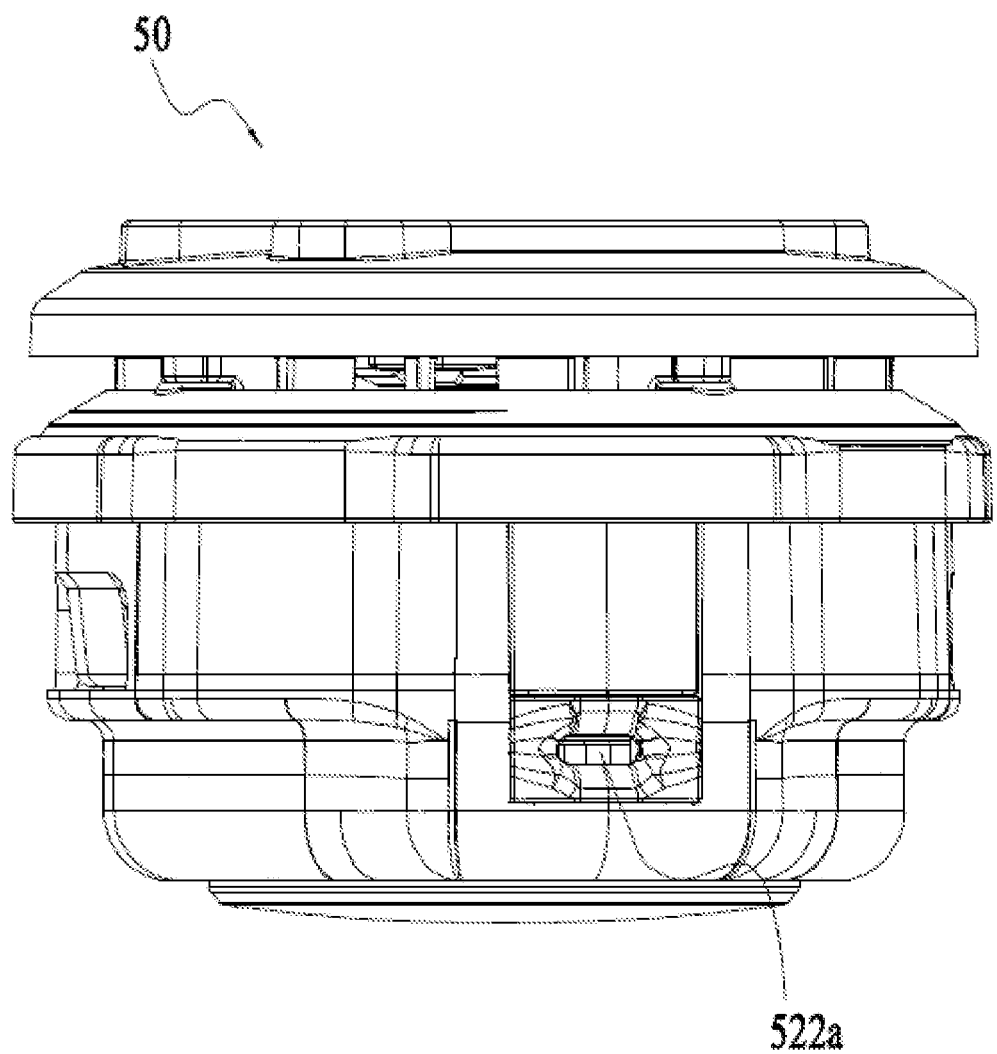
FIG. 15 is a perspective view of a grass cutting head according to third example.
Figure 16:
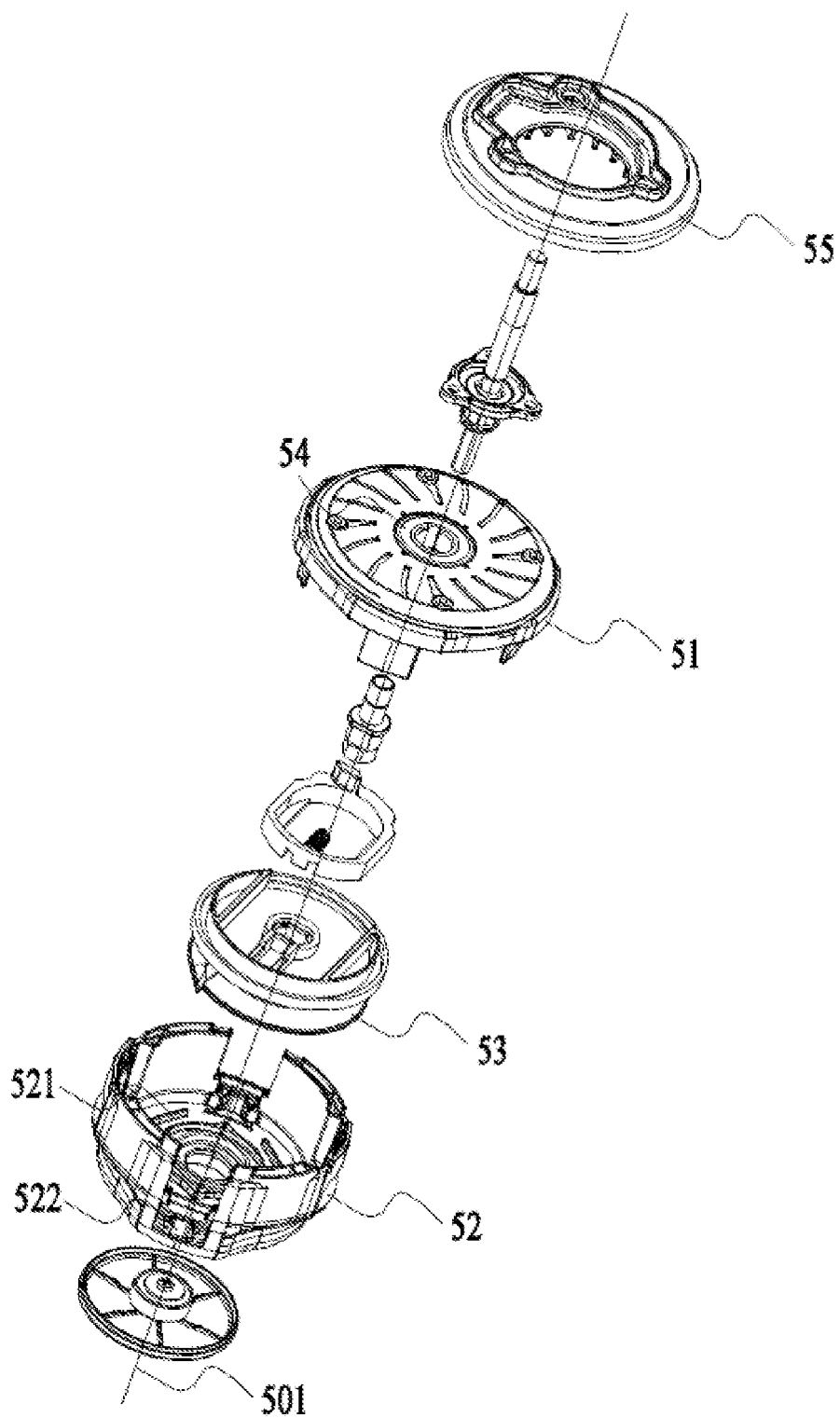
FIG. 16 is an exploded view of the grass cutting head of FIG. 15.
Figure 17:
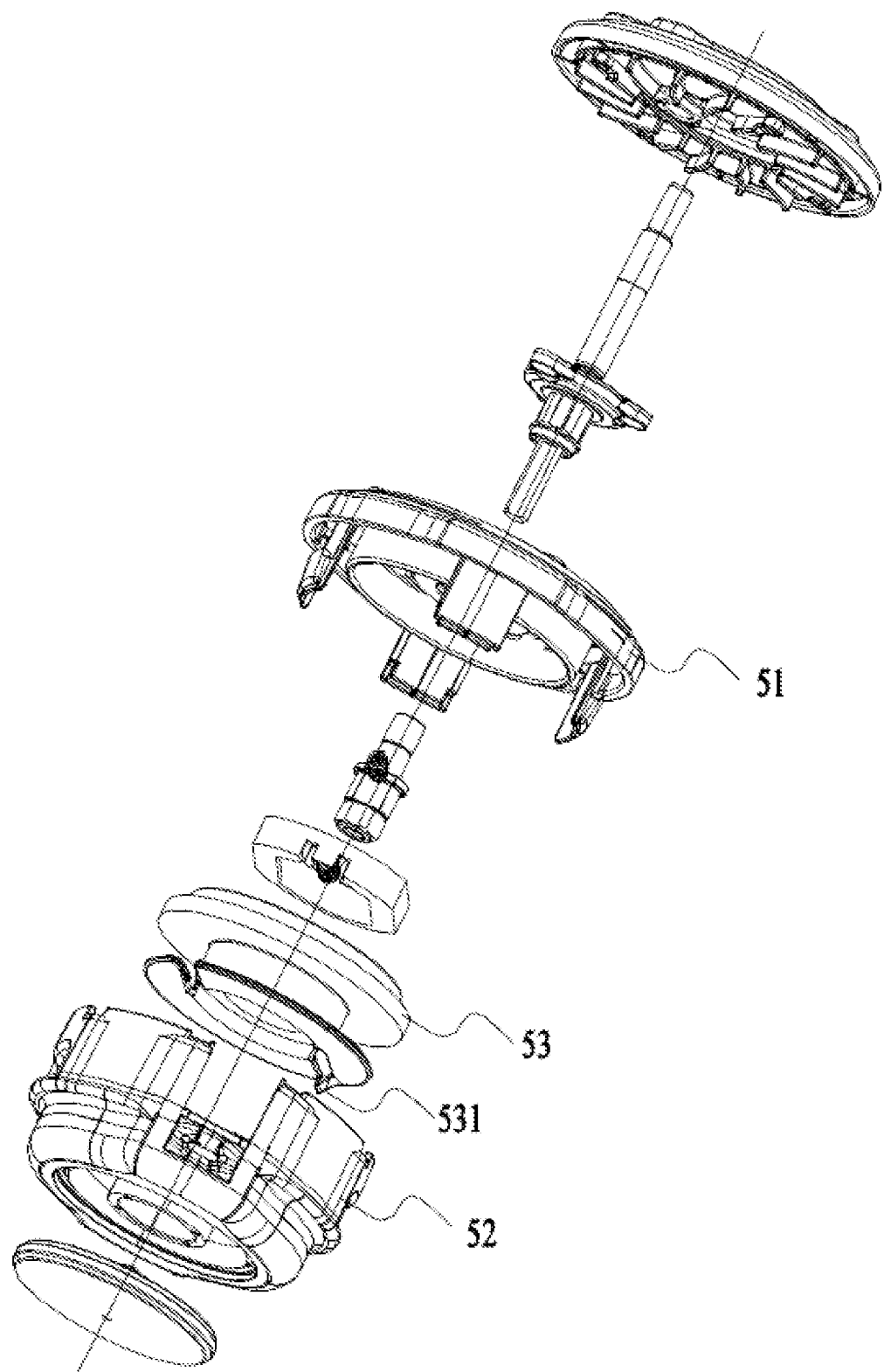
FIG. 17 is an exploded view of the grass cutting head of FIG. 16 taken from another perspective.

In an example, the grass trimmer has the same driving apparatus and operating apparatus as in the first example, and only the structures in this example different from first example will be described below. FIGS. 15 to 17 show the grass cutting head 50 of the grass trimmer in third example. In this example, the head housing includes a first housing portion 51 and a second housing portion 52. The first guiding structure 521 is disposed on the second housing portion 52, and the second housing portion 52 is specifically an end farther from the driving apparatus. The second guiding structure 531 is disposed on the spool 53 and is disposed on a side closer to the first guiding structure 521. The first guiding structure 521 is fixedly connected to or integrally formed with the second housing portion 52. The first guiding structure 521 is provided with the same guiding area 521a through which the grass cutting line passes, the same temporary storage area 521b for the grass cutting line, and the same rotation area 521c in which the second guiding structure 531 rotates as in first example. In this example, the guiding area 521a is actually an arc-shaped area distributed around the first axis 501. As an optional example, the guiding area 521a may also be a linear area intersecting with the first axis 501 or close to the first axis 501.

Figure 18:
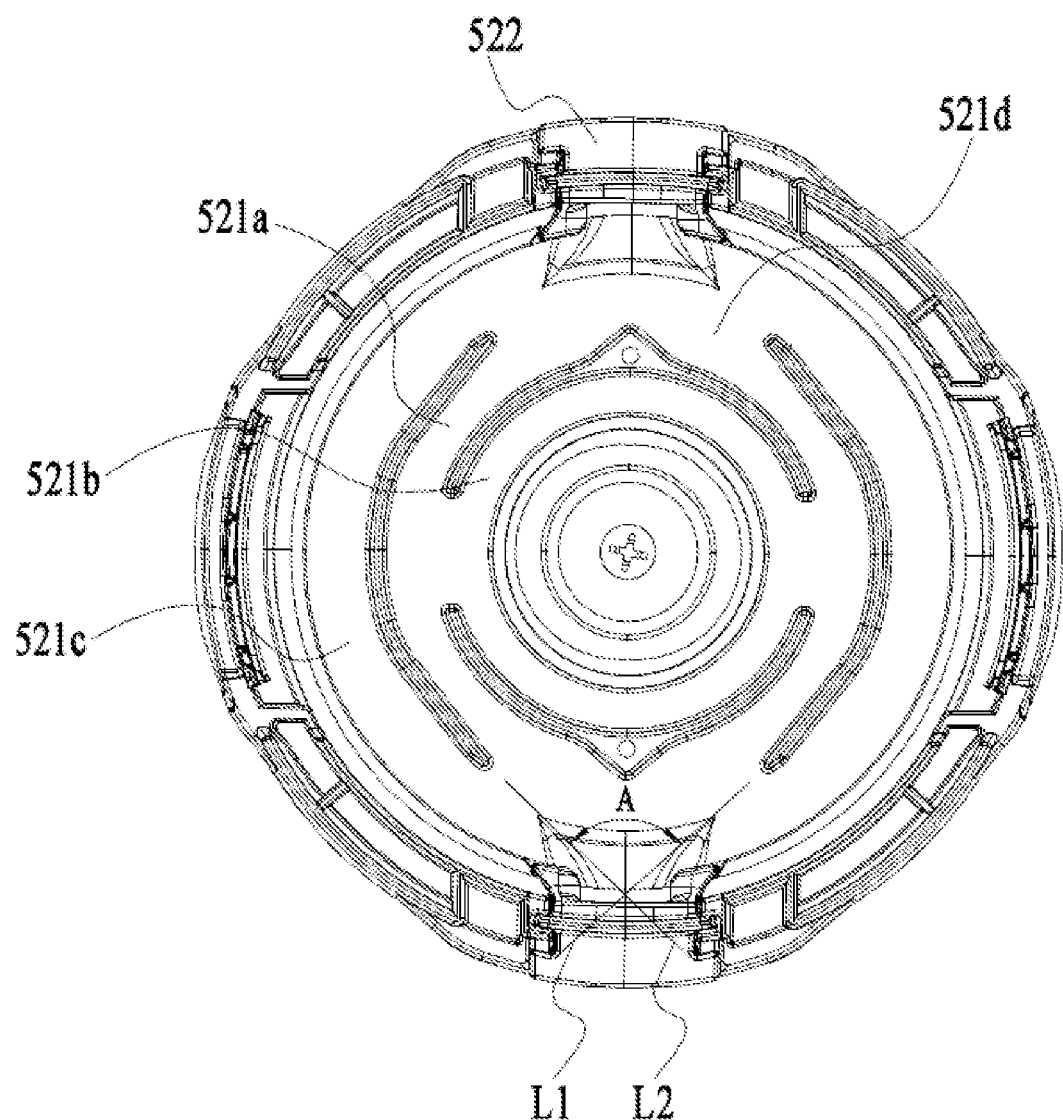
FIG. 18 is a plan view of the second housing of the grass cutting head of FIG. 16.
Figure 19:
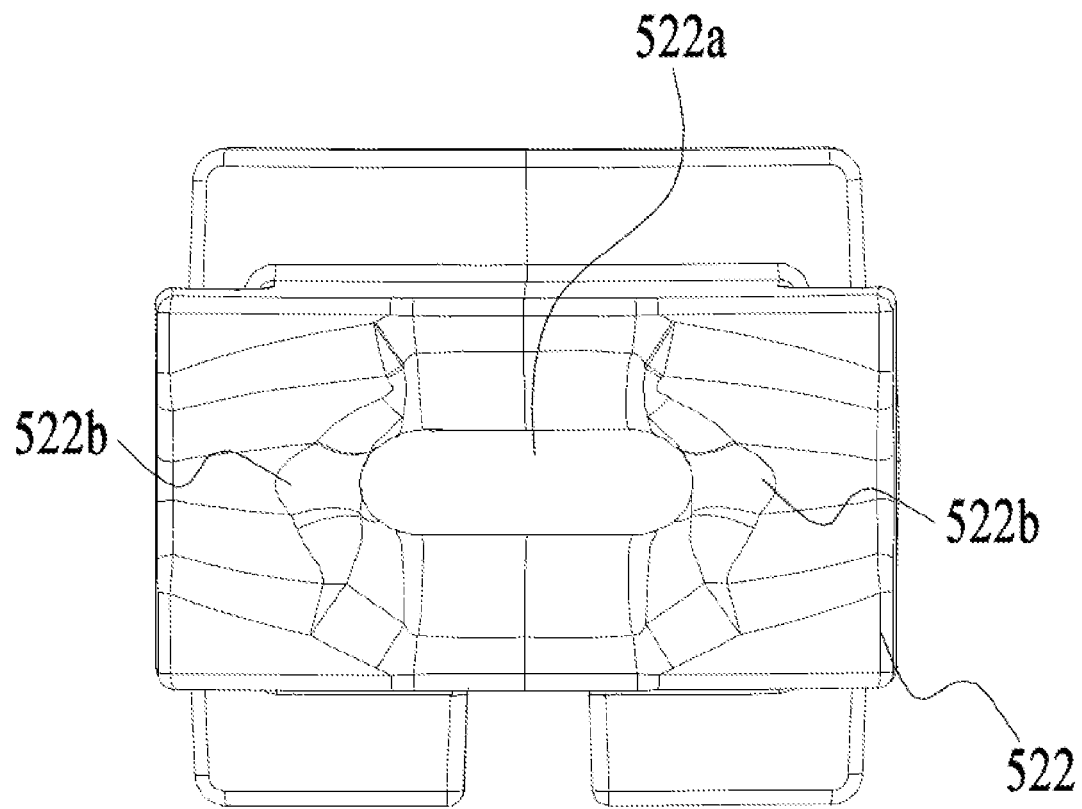
FIG. 19 is a plan view of the eyelet member of the grass cutting head of FIG. 16.
Figure 20:
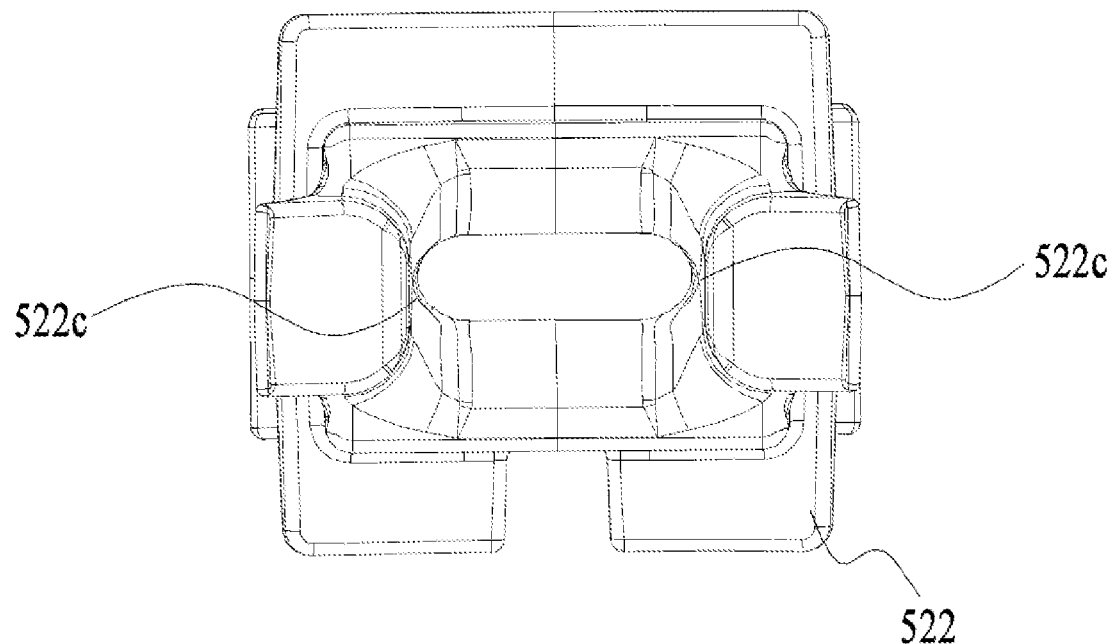
FIG. 20 is a plan view of the second surface of the eyelet member of the grass cutting head of FIG. 16.

As illustrated in FIGS. 18 to 20, the second housing portion 52 further includes an eyelet member 522 configured for allowing the grass cutting line to pass in or out. The eyelet member 522 includes one outer threading hole 522a extending around the circumference of the first axis 501. The eyelet member 522 is specifically a waist-shaped hole. The eyelet member 522 includes a first surface and a second surface. The first surface and the second surface communicate with each other and form the outer threading hole 522a. The first surface is provided with a first guiding surface 522b for the grass cutting line to pass in or out, and the first guiding surface 522b is smooth and continuous. The second surface is provided with a second guiding surface 522c for the grass cutting line to pass in or out, and the second guiding surface 522c is smooth and continuous. In the case where the outermost edge of the first guiding surface 522b is connected to the innermost edge of the second guiding surface 522c farther from the first guiding surface 522b, connecting lines L1 and L2 are provided around the circumference of the first axis 501, and a preset included angle A is formed between L1 and L2. In this example, the length of the outer threading hole 522a on the eyelet member 522 in a direction perpendicular to the first axis 501 is greater than the length of the outer threading hole 522a in the direction of the first axis 501. Therefore, when threading the grass cutting line, the grass cutting line is allowed to have a relatively large range of movement around the circumference of the first axis 501 so that the grass cutting line adapts to the first guiding structure 521. The height of the outer threading hole 522a of the eyelet member 522 in the direction of the first axis 501 is basically the same as the height of the guiding area 521a of the first guiding structure 521 in the direction of the first axis 501. That is, there is basically no height difference between the height of the outer threading hole 522a of the eyelet member 522 in the direction of the first axis 501 and the height of the guiding area 521a of the first guiding structure 521 in the direction of the first axis 501. Therefore, the following problem can be avoided: the grass cutting line is misaligned when passing through one of the eyelet members 522 into the guiding area 521a and out of another eyelet member 522, and thus the grass cutting line cannot quickly pass out. In fact, the length of the outer threading hole 522a distributed in a direction perpendicular to the first axis 501 is relatively large. Therefore, in the case where the grass cutting line passes in the eyelet member 522, the grass cutting line may have a relatively large range to adapt to the bending of the guiding area 521a. In this manner, the bending amount of the grass cutting line is reduced, and the following problem can be avoided: in the case where the grass cutting line passes out of another eyelet member 522, due to the large deformation amount, the grass cutting line deviates from the outer threading hole 522a of the eyelet member 522 and thus fails to pass through. On the other hand, in the case where the grass cutting line passes out of the eyelet member 522 from the other end, due to the relatively large circumferential space, the probability of the grass cutting line deviating from the outer threading hole 522a can be reduced. In fact, under the action of the guiding area 521a of the first guiding structure 521, the range for the grass cutting line to pass in or out is limited to the included angle A formed by the two connecting lines L1 and L2 of the outer threading hole 522a. Moreover, the two guiding surfaces of the outer threading hole 522a also effectively guide the grass cutting line to pass in the guiding area 521a of the first guiding structure 521 and prevent the grass cutting line from deviating from the guiding area 521a and entering the rotation area 521c. In this example, a damping apparatus is further provided for the relative rotation between the head housing and the spool 53. At the same time, a control switch is further provided for controlling the activation of the damping apparatus. The damping apparatus may specifically be a stop pin (not shown in the figure) that produces a damping effect on the head housing. The damping apparatus may also be a one-way bearing 54 and a rotation support 55 that matches with the one-way bearing 54. The one-way bearing 54 makes two parts or parts connected to the one-way bearing 54 rotate relative to one another in one rotation direction and not rotate relative to one other in another rotation direction. The rotation support 55 is rotatably connected to a part of the grass cutting head 310 and supports the rotation of the grass cutting head 310. The rotation support 55 may be the first housing that accommodates the motor in the grass trimmer, or may be other parts fixedly connected to the first housing such as a grass trimmer guard.

More specifically, the one-way bearing 54 is disposed between the rotation support 55 and the first housing portion 51 so that the rotation support 55 and the first housing portion 51 form a one-way rotation connection. That is, in the case where the rotation support 55 is used as a reference, the first housing portion 51 can rotate in one rotation direction but cannot rotate in another rotation direction.

The driving shaft is connected to the spool 53 in a non-rotational manner so that the spool 53 rotates in both directions relative to the rotation support 55. In the case where the rotation support 55 is used as a reference, the spool 53 can rotate forward or backward.

Similar to the foregoing, the spool 53 is provided with a first circumferential transmission structure, and the first housing portion 51 is provided with a second circumferential transmission structure that matches with the first circumferential transmission structure. The difference is that at least one of the transmission surfaces of the first circumferential transmission structure and the second circumferential transmission structure that can achieve transmission is parallel to the axis, which makes the first circumferential transmission structure unable to disengage from the second circumferential transmission structure in the case where the first circumferential transmission structure and the second circumferential transmission structure rotate in a certain rotation direction.

Based on the preceding hardware, in the case where the motor (not shown in the figure) rotates forward, the driving shaft drives the spool 53 to rotate forward. In this case, the first circumferential transmission structure and the second circumferential transmission structure achieve torque transmission through the transmission surface parallel to the axis. At the same time, the one-way bearing 54 is provided so that the first housing portion 51 can rotate forward relative to the rotation support 55 (that is, relative to the entire grass trimmer). Therefore, in this case, the spool 53 and the first housing portion 51 rotate synchronously, and the grass trimmer may execute the cutting mode. In the case where the motor rotates backward, the driving shaft drives the spool 53 to rotate backward. Since the one-way bearing 54 prevents the first housing portion 51 from rotating backward, the first housing portion 51 makes the spool 53 rotates relative to the first housing portion 51. In this case, since the contact surface between the first circumferential transmission structure and the second circumferential transmission structure is a ramp, the first circumferential transmission structure is disengaged from the second circumferential transmission structure. The first circumferential transmission structure and the second circumferential transmission structure cannot completely hinder the relative movement between the spool 53 and the first housing portion 51. Therefore, in this case, the spool 53 rotates relative to the first housing portion 51 continuously so that the grass trimmer may execute an automatic winding mode.

In this example, the grass trimmer further includes the automatic winding mode in which the grass cutting line is wound around the spool 53. Specifically, after the grass cutting line passes through the outer eyelet member 522 of the eyelet member 522 to the guiding area 521a, the grass cutting line passes out of the outer threading hole 522a of another eyelet member 522. In this case, the automatic winding mode is activated, and the motor drives the spool 53 to rotate relative to the head housing. In the case where the second guiding structure 531 disposed on the spool 53 starts to rotate in the rotation area 521c until the second guiding structure 531 moves to the notch 521d of the first guiding structure 521, the grass cutting line is pushed by the guiding surface of the second guiding structure 531, enters the temporary storage area 521b from the guiding area 521a of the first guiding structure 521, at least partially slides along the guiding surface of the second guiding structure 531 into the accommodation groove of the spool 53, and enters the winding groove at the same time. The spool 53 continues to rotate relative to the head housing, and thus the grass cutting line is continuously wound around the winding groove.

What is claimed is:

1. A grass cutting head, comprising:
 a spool configured to wind a grass cutting line;
 a head housing configured to accommodate at least part of the spool;
 a first guiding structure disposed at least partially in the head housing or connected to the head housing, the first guiding structure being configured to guide the grass cutting line through the head housing when threading the grass cutting line; and
 a second guiding structure formed on the spool or connected to the spool, the second guiding structure being configured to guide the grass cutting line to move and be wound around the spool by relative rotation created between the spool and the head housing when threading the grass cutting line;
 wherein the head housing comprises a first housing and a second housing, the first guiding structure is disposed at least partially in or connected to the first housing, the spool is disposed between the first housing and the second housing, and the first housing or the second housing is provided with an outer threading hole configured for allowing the grass cutting line to pass in or out.

2. The grass cutting head of claim 1, further comprising an eyelet member detachably connected to the outer threading hole and wherein the eyelet member is provided with a threading hole.

3. The grass cutting head of claim 2, wherein a length of the threading hole in a direction parallel to an axis of the head housing is less than a length of the threading hole in a circumference of the head housing.

4. The grass cutting head of claim 1, wherein the first guiding structure comprises a guiding portion that is configured to guide the grass cutting line and that is symmetrically disposed about a straight line passing through the outer threading hole and an axis of the head housing.

5. The grass cutting head of claim 4, wherein the first guiding structure comprises a threading channel configured to guide the grass cutting line through the head housing and a notch communicated with the threading channel configured to allow the grass cutting line to pass in or out, and the threading channel is disposed outside of the spool.

6. The grass cutting head of claim 5, wherein the threading channel comprises a threading guiding area configured to allow the grass cutting line to pass through, a temporary storage area configured to temporarily store a part of the grass cutting line passing through the threading guiding area, and a rotation area configured to allow the second guiding structure to rotate therein, and the guiding portion is configured to divide the threading channel into a left threading channel and a right threading channel.

7. The grass cutting head of claim 1, wherein the spool comprises a winding groove configured to wind the grass cutting line, a stopper configured to prevent the grass cutting line from detaching from the winding groove in a first axis, and an accommodation groove configured to accommodate part of the grass cutting line, and the stopper is further configured to form the second guiding structure or be connected to the second guiding structure.

8. The grass cutting head of claim 7, wherein the stopper is provided with an opening, the second guiding structure is disposed at the opening, and the second guiding structure is configured to guide the grass cutting line into the winding groove when the grass cutting head enters a winding mode.

9. The grass cutting head of claim 7, wherein the stopper comprises a first stopping portion and a second stopping portion and the winding groove is located between the first stopping portion and the first stopping portion.

10. The grass cutting head of claim 8, wherein the second guiding structure is tilted upward from the stopper.

11. The grass cutting head of claim 8, wherein a distance between the second guiding structure and the head housing is less than a diameter of the grass cutting line.

12. A grass cutting head, comprising:
a spool provided with a winding groove configured to wind a grass cutting line;
a head housing configured to accommodate at least part of the spool;
a first guiding structure disposed at least partially in the head housing or connected to the head housing, the first guiding structure being configured to guide the grass cutting line through the head housing without entering the spool when threading the grass cutting line; and
a second guiding structure formed on the spool or connected to the spool, the second guiding structure being configured to guide the grass cutting line to leave the first guiding structure and be wound around the winding groove of the spool by relative rotation created between the spool and the head housing when threading the grass cutting line.

13. The grass cutting head of claim 12, wherein the first guiding structure comprises a threading channel configured to guide the grass cutting line through the head housing and a notch communicated with the threading channel configured to allow the grass cutting line to pass in or out.

14. The grass cutting head of claim 13, wherein the threading channel comprises a threading guiding area configured to allow the grass cutting line to pass through, a temporary storage area configured to temporarily store the part of the grass cutting line passing through the threading guiding area, and a rotation area configured to allow the second guiding structure to rotate therein.

15. The grass cutting head of claim 14, wherein the threading guiding area is a circular arc surrounding a first axis.

16. The grass cutting head of claim 14, wherein the threading guiding area is a linear area passing through a first axis or adjacent to the first axis.

17. The grass cutting head of claim 14, wherein the first guiding structure is provided with a first protrusion, a second protrusion, a third protrusion, and a fourth protrusion, the first protrusion and the second protrusion form the temporary storage area, the second protrusion and the third protrusion form the threading guiding area, and the third protrusion and the fourth protrusion form the rotation area.

18. The grass cutting head of claim 14, wherein the threading channel is provided with a guiding portion at a position adjacent to the notch and the guiding portion is configured to guide the grass cutting line into the threading guiding area.

19. A grass trimmer, comprising:
a grass cutting head;
a motor configured to drive the grass cutting head to rotate around a first axis;
a spool configured to wind a grass cutting line;
a head housing configured to accommodate at least part of the spool;
a first guiding structure disposed at least partially in the head housing or connected to the head housing, the first guiding structure being configured to guide the grass cutting line through the head housing when threading the grass cutting line; and
a second guiding structure formed on the spool or connected to the spool;
wherein the grass trimmer further has a winding mode and the second guiding structure is configured to guide the grass cutting line to move and be wound around the spool by relative rotation created between the spool and the head housing when threading the grass cutting line.

20. The grass trimmer of claim 19, wherein the first guiding structure comprises a threading channel configured to guide the grass cutting line through the head housing and a notch communicated with the threading channel configured to allow the grass cutting line to pass in or out, the threading channel comprises a threading guiding area configured to allow the grass cutting line to pass through, a temporary storage area configured to temporarily store the part of the grass cutting line passing through the threading guiding area, and a rotation area configured to allow the second guiding structure to rotate therein, the first guiding structure is provided with a first protrusion, a second protrusion, a third protrusion, and a fourth protrusion, the first protrusion and the second protrusion form the temporary storage area, the second protrusion and the third protrusion form the threading guiding area, and the third protrusion and the fourth protrusion form the rotation area.

* * * * *